(12) United States Patent  (10) Patent No.: US 7,839,560 B2
Davis et al.  (45) Date of Patent: Nov. 23, 2010

(54) PACKAGED SPATIAL LIGHT MODULATOR AND A DISPLAY SYSTEM USING THE SAME

(75) Inventors: Michael Terry Davis, Richardson, TX (US); Gary Randall James, Wylie, TX (US)

(73) Assignee: Texas Instruments Incorporated, Dallas, TX (US)

( * ) Notice: Subject to any disclaimer, the term of this patent is extended or adjusted under 35 U.S.C. 154(b) by 207 days.

(21) Appl. No.: 11/962,947

(22) Filed: Dec. 21, 2007

(65) Prior Publication Data

US 2008/0158892 A1   Jul. 3, 2008

Related U.S. Application Data

(60) Provisional application No. 60/882,882, filed on Dec. 29, 2006.

(51) Int. Cl.
G02B 26/00 (2006.01)
(52) U.S. Cl. .................................. 359/291; 359/290
(58) Field of Classification Search ................ 359/223, 359/224, 290, 291
See application file for complete search history.

(56) References Cited

U.S. PATENT DOCUMENTS

| 6,567,138 | B1 * | 5/2003 | Krusius et al. ............... 349/73 |
| 7,034,985 | B1 | 4/2006 | Huibers et al. |
| 7,176,994 | B2 * | 2/2007 | Maeda et al. ............... 349/113 |
| 7,327,508 | B2 * | 2/2008 | Song et al. ............... 359/223.1 |
| 7,453,475 | B2 * | 11/2008 | Nitta et al. ................. 345/690 |
| 7,476,961 | B2 * | 1/2009 | Haskett et al. ............. 257/680 |
| 7,543,943 | B1 * | 6/2009 | Hubby, Jr. .................... 353/84 |
| 7,654,878 | B2 * | 2/2010 | Morley et al. ................ 445/24 |

* cited by examiner

*Primary Examiner*—Timothy J Thompson
(74) *Attorney, Agent, or Firm*—Charles A. Brill; Wade James Brady III; Frederick J. Telecky, Jr.

(57) ABSTRACT

A spatial light modulator comprises an array of individually addressable pixels enclosed within a space formed by a package lid and a package substrate. An aperture through which incident visible light pass into the package is formed on the package lid. In display systems employing the spatial light modulator, the illumination system is focused on a plane away from the pixels of the spatial light modulator so as to reduce cost.

18 Claims, 3 Drawing Sheets

PACKAGED SPATIAL LIGHT MODULATOR AND A DISPLAY SYSTEM USING THE SAME

CROSS REFERENCE TO RELATED PATENT APPLICATIONS

This patent application claims priority from co-pending U.S. provisional patent application Ser. No. 60/882,882 to Davis, filed Dec. 29, 2006, the subject matter being incorporated herein by reference in its entirety.

TECHNICAL FIELD OF THE DISCLOSURE

The technical field of this disclosure is generally related to the art of microelectromechanical devices, and more particularly, to spatial light modulators for use in display systems and display systems using the same.

BACKGROUND OF THE DISCLOSURE

Spatial light modulators, such as micromirror-based spatial light modulators, liquid crystal panels and liquid-crystal-on-silicon panels, have been widely used in display systems. In display systems employing spatial light modulators, apertures, such as light blocking/absorbing masks, are often provided to cover non-active areas of the spatial light modulators and to block image artificial effects caused by unavoidable illumination of surrounding areas, such as bond wires, bond pads, die edges, test structures etc, from being visible in projected images. Utilization of apertures in spatial light modulators may significantly increase costs of spatial light modulators.

In a typical display system employing a spatial light modulator, the modulator comprises a package in which the array of individually addressable pixels is enclosed for protection. Illumination light of the display system is often focused on the active area of the spatial light modulator, wherein the active area is referred to an area in which pixels of the spatial light modulator are modulated for generating desired images. The size of the aperture used with the spatial light modulator is substantially determined so as not to block the incident light from illuminating the active area. Once the size of the aperture is determined, the size of the die (e.g. the substrate on which functional members of the spatial light modulator are formed) of the spatial light modulator is determined based on the aperture size so as to avoid imaging surrounding areas of the spatial light modulator on to produced images. As the distance between the aperture and the die (or the active area) increases, the size of the die increases, which increases the cost of the spatial light modulator.

The aperture used with the spatial light modulator itself may account for a large percentage of the total cost of the spatial light modulator because a typical aperture comprises relatively expensive multi-layer dichroic coatings. The multi-layered dichroic coatings each often comprise exotic materials that are often expensive. Moreover, the apertures are often formed on top or bottom surfaces of the package lids of packages, in which pixel arrays of the spatial light modulators are enclosed for protection. Forming the apertures on the package lids by coating the exotic materials is costly and difficult.

SUMMARY OF THE DISCLOSURE

In one example, a package of a spatial light modulator having an array of pixels is disclosed herein. The packaged spatial light modulator comprises: a package substrate having a supporting surface on which the spatial light modulator is disposed; a package lid bonded to the package substrate and forming a space in which the spatial light modulator is enclosed; and a light blocking/absorbing mask having an aperture through which visible light can pass into the package, wherein the aperture has a size that is substantially the same as a size of the array of pixels.

In another example, a display system is provided. The system comprises: an illumination system providing light; a packaged spatial light modulator that comprises: an array of individually addressable pixels disposed between a package lid and a package substrate; and a light blocking/absorbing mask having an aperture through which visible light can pass into the package, wherein the aperture has a size that is substantially the same as a size of the array of pixels; and a set of optical elements for directing the light onto the pixel array and directing the light from the pixel array onto a display target.

In yet another example, a display system is provided that comprises: an illumination system providing light; a packaged spatial light modulator that comprises: an array of individually addressable pixels disposed between a package lid and a package substrate; and a light blocking/absorbing mask comprising an aperture through which the light from the illumination system can illuminate the array of pixels of the spatial light modulator; and an optical element that direct the light from the illumination system onto the pixel array through the aperture, wherein the pixel array of the spatial light modulator is at a plane that is away from a focal plane of the optical element.

In yet another example, a method of producing an image is provided that comprises: producing light; directing the light onto an array of individually addressable pixels disposed between a package lid and a package substrate of a package, wherein the light is defocused from the pixel array; modulating the light by the pixels of the pixel array; and causing the modulated light to be displayed on a display target.

DETAILED DESCRIPTION OF EXAMPLES

Disclosed herein is a packaged spatial light modulator that comprises an array of individually addressable pixels and an aperture. The aperture has a size that is substantially equal to the size of the active area of the pixel array in the spatial light modulator. In a display system employing the packaged spatial light modulator, incident light of the display system can be focused on a plane away from the pixel array of the active area. The incident light may or may not be focused on the plane of the aperture. In the following, the packaged spatial light modulator and the method of using the packaged spatial light modulator in a display system will be discussed with reference to selected examples. However, it will be appreciated by those skilled in the art that the following discussions are for demonstration purpose, and should not be interpreted as a limitation. Other variations within the scope of this disclosure are also applicable.

Figure 1:
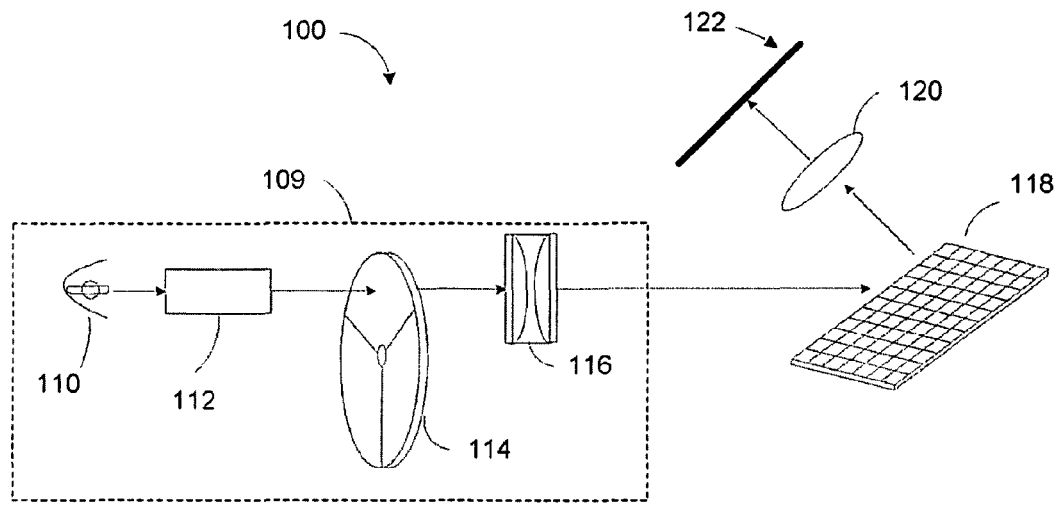
FIG. 1 diagrammatically illustrates an exemplary display system employing a packaged spatial light modulator, in which examples of the disclosure can be implemented.

Turning to the drawings, FIG. 1 schematically illustrates an exemplary display system in which examples of this disclosure can be implemented. In this example, display system 100 comprises illumination system 109, packaged spatial light modulator 118, and projection lens 120. Screen 122, on which images are to be displayed, can be a member of display system 100, or can be a separate member.

The illumination system (109) is designated for providing illumination light for the display system; and can be implemented in a wide range of ways. For example, the illumination system (109) may use any suitable types of illuminators, such as arc lamps and solid state light emitting devices (e.g. lasers and light-emitting-diodes LEDs); and the illumination system may comprise any suitable numbers of illuminators of the same or different types. When solid-state illuminators are used for generating light of different colors, the illumination system may comprise multiple solid-state illuminators for generating light of sub-substantially the same color. The illumination system (109) may comprise other optical and/or non optical components for directing the light from the illuminator(s) towards the spatial light modulator (118) with a desired profile (e.g. illumination intensity distribution and the shape of the near- and/or far-field illumination field).

By way of example as illustrated in FIG. 1, the illumination system (109) comprises arc lamp 110, optical integrator 112, color filter 114, and condensing lens 116. The arc lamp produces white light; and the produced light is directed to color filter 114 through optical integrator 112. In this example, optical integrator 112 is disposed between the arc lamp (110) and color filter (114). In another exemplary configuration, optical integrator 112 can be disposed after the color filter (114) along the propagation path of the light from the arc lamp. The color filter (114) in this example is a spinning color wheel comprising a set of transmissive color segments. In other examples, the color filter can be implemented in other different ways, such as reflective color wheel or optical color filters. As the color wheel (114) spins, color segments of the color wheel sequentially intercept the incident light, thereby, generating sequential colors. The generated light of different colors sequentially illuminates the pixels of the packaged spatial light modulator (118) through condensing lens 116.

The package spatial light modulator modulates the incident light based on the image to be displayed. Specifically, the packaged spatial light modulator modulates the incident light of each color based upon the image data (e.g. bitplanes) derived from the color image component of the image to be displayed, wherein the color image component corresponds to the color illuminating the packaged spatial light modulator.

Pixels of the packaged spatial light modulator can be any suitable reflective or transmissive devices, such as reflective and deflectable micromirrors, liquid-crystal devices, and liquid crystal-on-silicon devices. By way of example, FIG. 2 schematically illustrates a cross-sectional view of a portion of an array of pixels in a spatial light modulator, wherein the pixels are reflective and deflectable micromirrors.

Figure 2:
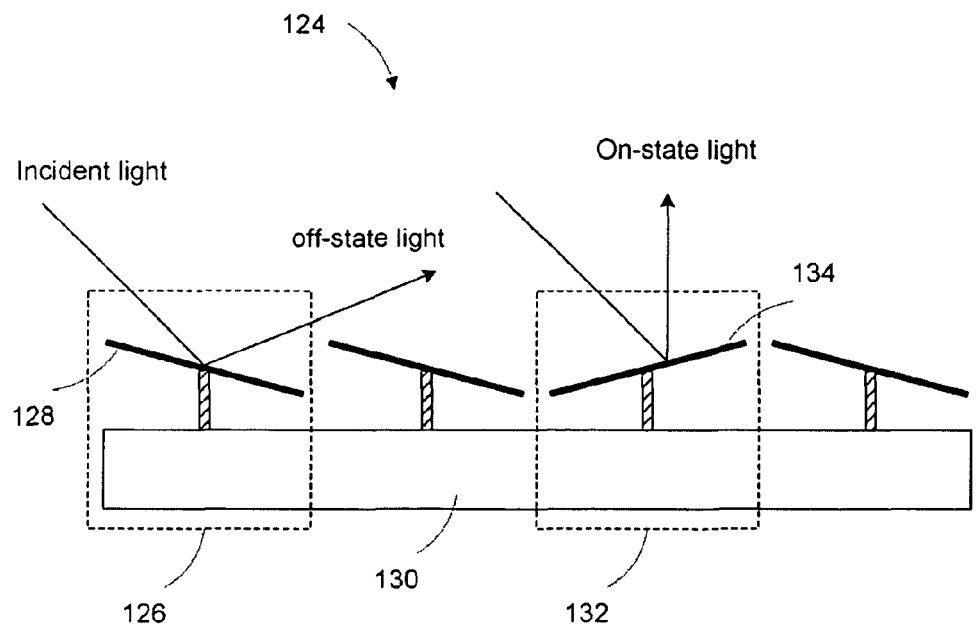
FIG. 2 schematically illustrates a cross-section of a portion of an exemplary micromirror array of the packaged spatial light modulator in FIG. 1.

For demonstration purposes, and ease of illustration, only 4 micromirrors are shown in FIG. 2. However, the pixel array of the spatial light modulator may comprise any suitable numbers of micromirrors. The total number of pixels in the pixel array of the spatial light modulator is often referred to as the native resolution of the pixel array or the native resolution of the spatial light modulator. Because a spatial light modulator may have active pixels (in the active pixel area) and inactive pixels (in the inactive pixel area), the native resolution of such a spatial light modulator is referred to as the total number of active pixels (in the active pixel area) of the spatial light modulator. For example, the spatial light modulator may have a native resolution of 640×480 (VGA) or higher, such as 800×600 (SVGA) or higher, 1024×768 (XGA) or higher, 1280×1024 (SXGA) or higher, 1280×720 or higher, 1400× 1050 or higher, 1600×1200 (UXGA) or higher, and 1920× 1080 or higher. Of course, the spatial light modulator may have other desired native resolutions.

Referring to FIG. 2, micromirror array 124 of the spatial light modulator (118 in FIG. 1) comprises an array of micromirrors, such micromirrors 126 and 132. Each micromirror comprises a mirror plate (e.g. mirror plate 128 of micromirror 126 and mirror plate 134 of micromirror 132) held above a substrate (e.g. substrate 130). The substrate can be a semiconductor substrate or other suitable substrates such as substrates that are transmissive to visible light. Each mirror plate has a reflective surface for reflecting the illumination light of the system, such as visible light. Each mirror plate is held on the substrate by a post such that the mirror plate is capable of moving (e.g. rotating) to different angles relative to the substrate.

The movement of the mirror plate can be accomplished by electronic torques derived from electrostatic fields established between the mirror plate and the addressing electrode(s) associated with the mirror plate. For simplicity, the electrode(s) is not shown in FIG. 2. The mirror plate can alternatively be moved by other methods, such as electromagnetic forces, which will not be discussed herein.

Because the mirror plates are capable of being moved to different angles or angular positions relative to the substrate (e.g. substrate 130), a beam of incident light (e.g. the illumination light of display system 100 in FIG. 1) can be directed (e.g. by reflection) to different spatial directions, a process of which is often referred to as spatial modulation of the incident light. Accordingly, the different angles or angular positions of mirror plates are defined as different operation states, such as an ON and an OFF state of the micromirrors when the micromirrors are to be operated at binary states. The spatial light modulator may comprise micromirrors, each of which is operated at a non-binary state. In this instance, each micromirror can have one or more intermediate states between the ON and OFF states.

The micromirror array (124) of the spatial light modulator can be disposed in a package for protection. An exemplary packaged spatial light modulator is schematically illustrated in FIG. 3.

Figure 3:
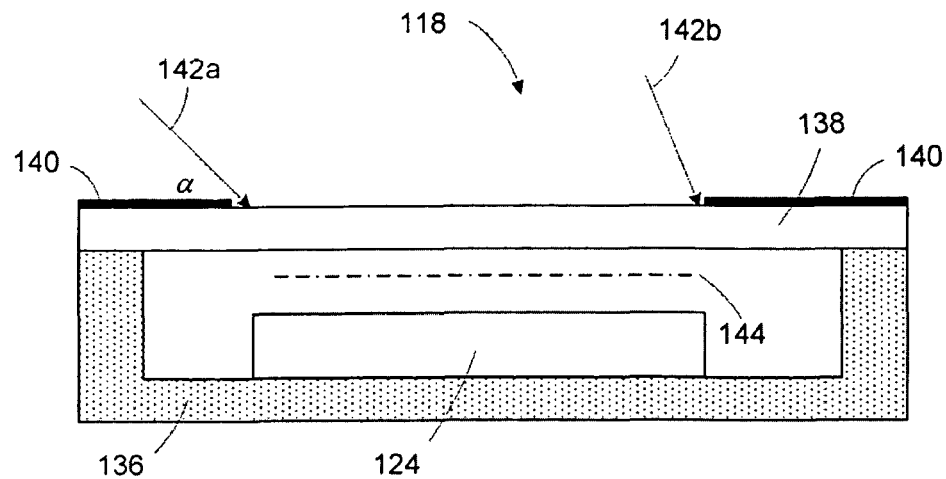
FIG. 3 schematically illustrates a cross-sectional view of an exemplary packaged spatial light modulator having an array of pixels for used in the display system of FIG. 1.

Referring to FIG. 3, micromirror array 124 of the spatial light modulator is disposed on a supporting surface of a cavity in package substrate 136. The package substrate may comprise any suitable materials, such as ceramic, plastic, or other materials.

The package substrate is bonded to package lid 138 so as to enclose micromirror array 124 within the cavity of the package substrate (136) or within the space between the package lid (138) and package substrate 136. The package lid can be hermetically bonded to the package substrate, though this is not required. The package lid (138) can comprise any suitable materials. In one example, the package lid is a plate that is transmissive to visible light, such as glass, quartz, and sapphire. When the package lid comprises a material that is non-transmissive to visible light, the package lid may comprise a portion, such as an inlay window, that is transmissive to the visible light. The package lid may be a substantially flat plate as illustrated in FIG. 3. Alternatively, the package lid can be other geometric forms, such as a cap. In the following discussions, it is assumed without losing generality that the package lid is a substantially flat plate; and comprises a material that is transmissive to visible light. It will be appreciated by those skilled in the art that the following discussions are also applicable to packaged spatial light modulators with other different configurations.

Aperture 140, which is a light blocking/absorbing mask having a centered opening in this example, is provided and disposed on the top surface of the package lid (138) in this example. The aperture can be a single film disposed on the top surface; or can be a film formed on the top surface of package lid (138) by a standard thin film deposition technique. The aperture (140) may comprise any suitable light absorbing/ blocking materials, and more preferably comprises material such that the light absorbing/blocking portion of the aperture is capable of absorbing/blocking 85% or more, 90% or more, 95% or more, or 99% or more light (e.g. visible light) incident hereto.

The aperture (140) can be disposed such that the opening of the aperture is aligned to the reflective surface (e.g. the reflective surfaces of the mirror plates of micromirror array 124). Specifically, the opening of aperture 140 is aligned to the active area of micromirror array 124 such that the illumination light passing through the aperture can substantially illuminate the entire active area of the micromirror array (124). In one example, a virtual straight line connecting the geometric center of the active area in the micromirror array (124) and the geometric center of the opening of aperture is substantially parallel to the normal direction of the active area and/or the package lid (138). In another example, a virtual straight line connecting the geometric center of the active area in the micromirror array (124) and the geometric center of the opening of aperture can be coincident to the principal axis (or the central axis) of the incident light bundle.

The vertical distance (i.e. the distance along the normal direction of package lid 138) between the mask (140) and the reflective surface of the pixels (e.g. the reflective surfaces of the micromirrors) of micromirror array 124 can be from 1 mm to 5 mm, such as from 2 mm to 3.5 mm or other desired values. In order to reduce the cost of the packaged spatial light modulator, the mask (140) has a characteristic dimension (e.g. the length, the width, or the diagonal) of 1 inch or less, such as 0.5 inch or less, or a value that matches the size of the active area of the micromirror array, which will be detailed in the following.

The packaged spatial light modulator (118) may have other suitable features. For example, the packaged spatial light modulator (118) may have getter and/or lubricant materials disposed inside the package. Alternatively, a compliant material with a coefficient thermal expansion (CTE) matching the package substrate and/or the substrate of the micromirror array (124) (e.g. a semiconductor substrate) can be disposed between the supporting surface of the package substrate and the substrate of the micromirror array. A heat dissipation mechanism can also be provided, such as at the bottom surface of the package substrate (136) for dissipating heat.

The packaged spatial light modulator (118) can be disposed in a display system in many different ways. In order to minimize the size of the aperture, thus minimizing the cost of the spatial light modulator, the packaged spatial light modulator (118) can be disposed in the display system (e.g. display system 100 in FIG. 1) such that the incident illumination light is focused on a focal plane away from the reflective surface of the micromirror array (124) of the packaged spatial light modulator (118). The focal plane of the illumination light (or illumination light bundle) is referred to as a plane wherein the illumination light bundle has a minimal illumination area. The illumination light bundle is referred to as the geometric profile of the illumination light including the spatial and angular extension of the incident light. Because the focal plane of the illumination light is accomplished by the specific optical configuration of the illumination system, the focal plane can also be referred to as the focal plane of the illumination system (e.g. illumination system 109 in FIG. 1). As illustrated in FIG. 3, plane 144 is a focal plane of the illumination light; and the illumination light has edge rays 142*a* and 142*b* in the cross-sectional view illustrated in FIG. 3. It is noted that edges rays 142*a* and 142*b* may or may not be parallel due to the angular extension of the illumination light.

In one example, the packaged spatial light modulator can be disposed in the display system such that the focal plane (144) is away from the reflective surface (e.g. the reflective surfaces of the mirror plates of the micromirror array 124) of micromirror array 124, or away from the plane of the pixels of the pixel array (124) when the pixels of the pixel array (124) are not reflective pixels. For example, the focal plane (144) can be at a location between the reflective surface of micromirror array 124 and the bottom surface of package lid 138. Alternatively, the focal plane (144) can be substantially at the plane of the bottom or the top surface of package lid 138, or at a plane between the top and bottom surfaces of package lid 138. In another example, focal plane 144 can be at the plane of aperture 140; or at a location above the top surface of package lid (138) and the aperture (140), but is preferably at a location in the vicinity of the aperture. Regardless of the different locations, the focal plane (144) is substantially parallel to the reflective surface of micromirror array (124) or the plane of the pixels in pixel array 124. In other examples, the focal plane (144) may have a non-zero angle to the reflective surface of micromirror array 124 or to the plane of the pixels in pixel array 124. Because the package lid, especially the bottom and/or the top surfaces of the package lid (or the inlay transmissive window of the package lid), may or may not be parallel to the reflective surface of micromirror array 124 or the plane of the pixels in pixel array 124, the focal plane (144) may or may not be parallel to the package lid (e.g. the top and/or the bottom surfaces of the package lid).

Figure 4:
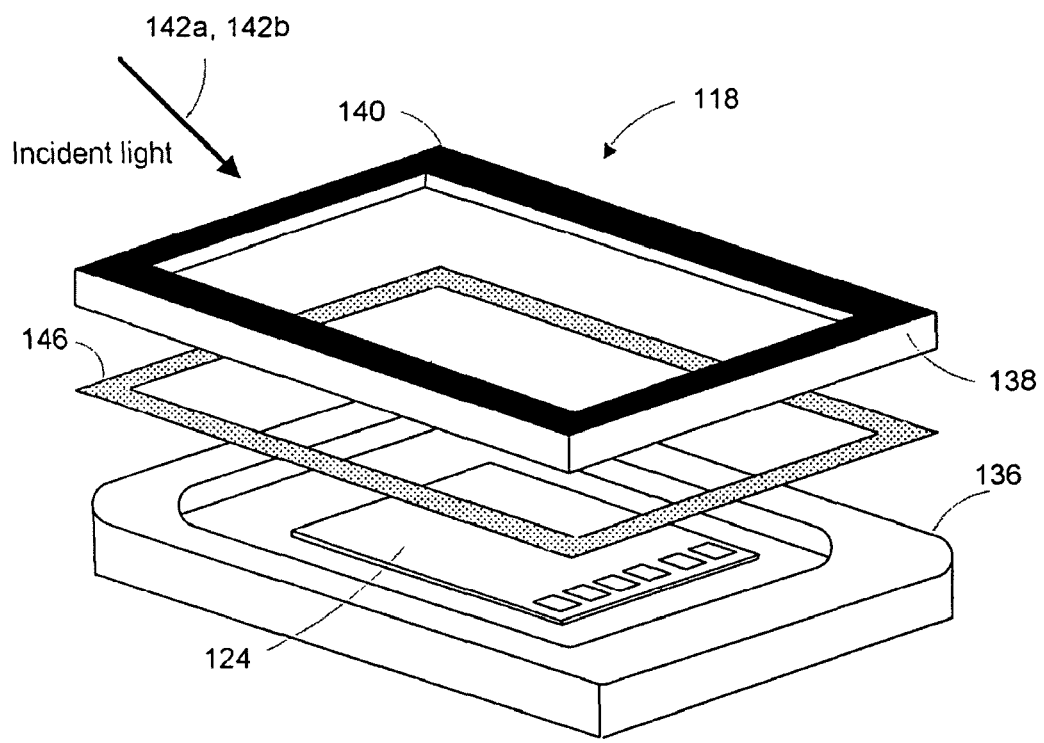
FIG. 4 schematically illustrates a perspective view of the packaged spatial light modulator in FIG. 3.

The structure of the packaged spatial light modulator (118) is better illustrated in a perspective view as schematically illustrated in FIG. 4. Referring to FIG. 4, packaged spatial light modulator 118 comprises package substrate 136. Micromirror array 124 is disposed on a supporting surface of the cavity of package substrate 136. Package lid 138 is bonded to the package substrate (138) using sealing material 146. Specifically, sealing material 146, which is a sealing frame in this example, bonds the rim of the package substrate 136 to the bottom substrate 138 so as to enclose micromirror array 124 within the cavity of the package substrate, or within the space between the package lid (138) and the supporting surface of the package substrate (136). Aperture 140, which is a frame in this example, is provided on the top surface of package lid 138. The aperture comprises light blocking/absorbing portions disposed around the perimeter of a transmissive portion (e.g. an opening) of the aperture. The transmissive portion (e.g. the opening) of the aperture has a dimension that matches the dimension of the active area in the enclosed micromirror array (124). The light blocking/absorbing portions of the aperture frame form the rim of the frame such that the rim has a dimension that is substantially the minimum dimension necessary for preventing the features (e.g. electrical connections, getters, and other features in the package) in the package to be illuminated by the incident light. However, in other examples, the aperture may have other desired dimensions and/or shapes.

Figure 5:
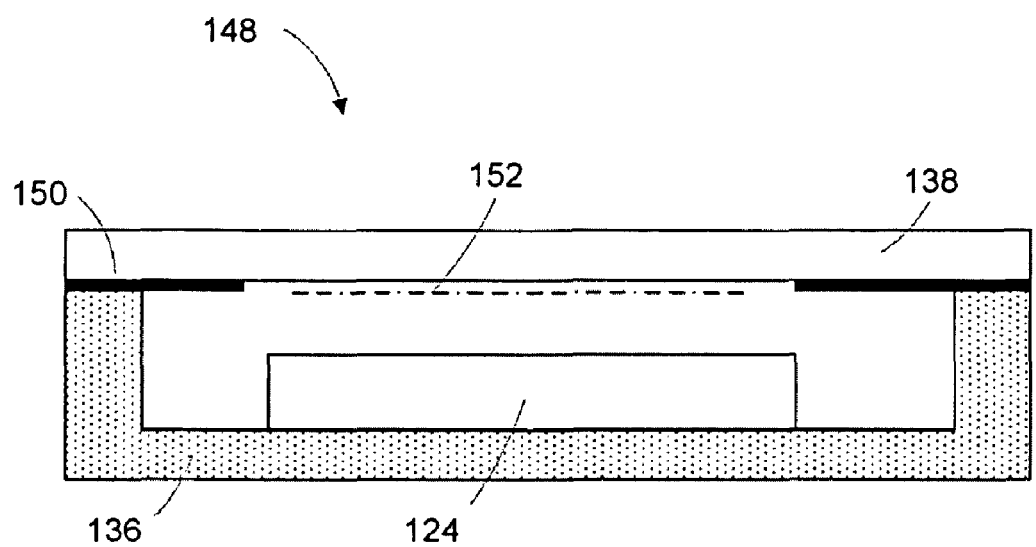
FIG. 5 schematically illustrates a cross-sectional view of another exemplary packaged spatial light modulator having an array of pixels for used in the display system of FIG. 1.

Instead of placing the aperture (140) on the top surface of the package lid (138) as illustrated in FIG. 4, the aperture can be placed on the bottom surface of the package lid, as schematically illustrated in FIG. 5. Referring to FIG. 5, aperture 150 is a light blocking/absorbing mask, which can be the same as aperture 140 in FIG. 4. In the example as illustrated in FIG. 5, aperture 150 is disposed between the rim of the package substrate 136 and the bottom surface of package lid 138. For example, the aperture (150) can be attached to the bottom surface of package lid 138; or alternatively be attached to the rim of package substrate 138. Micromirror array 124 is disposed on the supporting surface of the cavity in package substrate 136; and the package substrate (136) is bonded to package lid 138.

The distance between the aperture (150) and the surface of the pixels (e.g. the reflective surfaces of the micromirrors) can be from 1 mm to 5 mm, such as from 2 mm to 3.5 mm. In an example, the aperture has a characteristic dimension of 1 inch or less, such as 0.5 inch or less.

Plane 152 is the focal plane of the illumination light (or the focal plane of the illumination system). The packaged spatial light modulator (148) can be disposed in a display system (e.g. display system 100 in FIG. 1) such that the focal plane (152) is away from the reflective surface (e.g. the reflective surfaces of the mirror plates of the micromirror array 124) of micromirror array 124, or away from the plane of the pixels of the pixel array (124) when the pixels of the pixel array (124) are not reflective pixels. For example, the focal plane (152) can be at a location between the reflective surface of micromirror array 124 and the bottom surface of package lid 138. Alternatively, the focal plane (152) can be substantially at the plane of the bottom or the top surface of package lid 138, or at a plane between the top and bottom surfaces of package lid 138. In another example, focal plane 152 can be at the plane of aperture 150; or at a location above the top surface of package lid (138) and the aperture (150), but is preferably at a location in the vicinity of the aperture. Regardless of the different locations, the focal plane (152) is substantially parallel to the reflective surface of micromirror array (124) or the plane of the pixels in pixel array 124. In other examples, the focal plane (152) may have a non-zero angle to the reflective surface of micromirror array 124 or to the plane of the pixels in pixel array 124. Because the package lid, especially the bottom and/or the top surfaces of the package lid (or the inlay transmissive window of the package lid), may or may not be parallel to the reflective surface of micromirror array 124 or the plane of the pixels in pixel array 124, the focal plane (152) may or may not be parallel to the package lid (e.g. the top and/or the bottom surfaces of the package lid).

The position of the focal plane (152 in FIG. 5 and 144 in FIG. 4) can be obtained by adjusting the relative optical distances of the optical elements (e.g. optical integrator 112 and condensing lens 116) of the illumination system and the packaged spatial light modulator (118 in FIG. 1).

It is noted that FIG. 4 and FIG. 5 illustrate only two of many possible examples of packaged spatial light modulators having apertures. Other variations are also applicable. For example, an aperture can be disposed within the package, such as in the vicinity of the micromirror array (or the pixel array) of a packaged spatial light modulator.

Disposing the focal plane (144 in FIG. 4 or 152 in FIG. 5) away from the reflective surface of the micromirror array (or plane of the pixels of the spatial light modulator) in the packaged spatial light modulator can have many advantages, especially in lowering the cost for packaging and fabrication.

For example, by disposing the aperture such that the focal plane of the illumination light (or the illumination system of the display system) is in the vicinity of the lower surface of the package lid (138) or inside the package of the packaged spatial light modulator, the aperture may have a reduced size, which can be substantially the same size as the active area of the micromirror array or pixel array in the packaged spatial light modulator. Therefore the die size (e.g. the substrate of the micromirror array device) of the spatial light modulator in the packaged can be reduced by a comparable amount. This is of particular importance for those customers and/or some applications wherein cost is a major concern; and/or is more important than maximizing the performance. The mask (the aperture) can further be reduced by printing or painting on the outside of the package lid or the rim of the package substrate with lower cost materials.

Causing the focal plane (e.g. focal plane 144 in FIG. 4 and 152 in FIG. 5) to be away from the reflective surface or the pixel plane of the spatial light modulator in the package also allows for a marginally larger active area to fit in a package size that would not fit under current design rules, because the light shield can be smaller (which prevents a large cost increase due to a larger package and/or package lid). Specifically, this approach can eliminate the interior package lid surface aperture coating and replace it with a lower cost aperture on the outside surface (top surface) of the package lid. This may also reduce die size, thus reducing the cost of the packaged spatial light modulator.

The packaged spatial light modulator and their placements in display systems as discussed above can have other advantages. For example wherein an optical integrator (e.g. optical integrator 112 in FIG. 1) is employed as illustrated in FIG. 1, the exit aperture of the optical integrator (112) is imaged at the focal plane (e.g. focal plane 144 in FIG. 4 and 152 in FIG. 5) of the illumination system. Because the focal plane is away from the reflective surface of the micromirror array or away from the pixels of the pixel array of the packaged spatial light modulator, the image of the exit aperture of the optical integrator is away from the active area of the micromirror array, or away from the active area of the pixel array of the packaged spatial light modulator. As a consequence, solid glass optical integrators can be used without concern for dust contamination (e.g. dust contamination on the surface of the exit plane/aperture of the solid optical integrator) being visible. This is in comparison to an existing display system using a solid-optical integrator whose exit aperture is imaged onto the reflective surface of the micromirror array (or the plane of the pixels of the pixel array in the spatial light modulator), and where defects or contaminations at the exit aperture of the solid optical integrator are imaged onto the reflective surface or the pixel plane, which in turn, causes a visible image of the defects and/or other contamination within the produced image on the screen.

Using solid integrators also can lower the cost of the display system; and moreover can increase the thermal stability of the optical integrator for higher lumens display systems as compared to display systems using hollow optical integrators (also referred to as optical tunnels).

A typical hollow optical integrator uses an adhesive material to bond multiple reflective walls for forming the tunnel. Adhesive materials for such purpose are often expensive due to the optical requirements. Furthermore, adhesive materials in hollow optical integrators can melt under high temperatures (e.g. due to the use of high-lumen illuminators), which can cause device failure. Because high-lumen illuminators are desired for achieving brighter displayed images, the problems inherent in the use of high-lumen illuminators with hollow optical integrators can be avoided by using solid optical integrators instead.

Using a solid optical integrator can further reduce the system cost by eliminating the need for cooling mechanisms that are often provided in hollow optical integrators. There can be an improvement in uniformity due to the spillage of the lower-uniformity edges of the image off the pixel array of the spatial light modulator. Additionally, uniformity reduction by the optical design can be employed to limit the amount of light that is contained in those spillage areas without impacting uniformity performance in the active area. This can be done by vignetting the illumination optics, further reducing system cost by reducing optical element size and thus cost.

It will be appreciated by those skilled in the art that a new and useful packaged spatial light modulator and its arrangement in a display system have been disclosed. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

We claim:

1. A display system, comprising:
   an illumination system providing light;
   a packaged spatial light modulator that comprises:
   an array of individually addressable pixels disposed between a package lid and a package substrate; and
   a light blocking/absorbing mask having an aperture through which visible light can pass into the package, wherein the aperture is located closer to a focal plane of the light from the illumination system than the aperture is to the array, has a size that is substantially the same as a size of the array of pixels; and
   a set of optical elements for directing the light onto the pixel array and for directing the light from the pixel array onto a display target.

2. The system of claim 1, wherein the pixel array comprises 640*480 (VGA) or higher number of micromirrors.

3. The system of claim 2, wherein the aperture has a size of 1 inch or less.

4. The system of claim 2, wherein the aperture has a size of 0.5 inch or less.

5. The system of claim 2, wherein the aperture is at a plane focal plane of the incident light from the illumination system.

6. The system of claim 5, wherein the aperture is at a plane focal plane of an optical element that is capable of directing the light from the illumination system onto the pixel array.

7. The system of claim 5, wherein the aperture is at a bottom surface or a top surface of the packaging lid facing the micromirror array.

8. A display system, comprising:
   an illumination system providing light;
   a packaged spatial light modulator that comprises:
   an array of individually addressable pixels disposed between a package lid and a package substrate; and
   a light blocking/absorbing mask comprising an aperture through which the light from the illumination system can illuminate the array of pixels of the spatial light modulator; and
   an optical element that direct the light from the illumination system onto the pixel array through the aperture, wherein the light blocking/absorbing mask is located closer to a focal plane of the light from the illumination system than the array of individually addressable pixels are to the focal plane of the light from the illumination system.

9. The system of claim 8, wherein the pixels of the spatial light modulator are at a plane that is away from a focal plane of the light incident thereto from an optical element.

10. The system of claim 8, wherein the pixels are reflective and deflectable micromirrors or liquid-crystal-on-silicon devices.

11. The system of claim 8, wherein the aperture is at a plane focal plane of the incident light from the illumination system.

12. The system of claim 8, wherein the aperture is at a plane focal plane of said optical element.

13. The system of claim 8, wherein the aperture is at a bottom surface of the packaging lid facing the micromirror array.

14. The system of claim 13, wherein the aperture is a focal plane of said optical element.

15. The system of claim 13, wherein the aperture is at a top surface of the packaging lid.

16. The system of claim 13, wherein the aperture is a focal plane of the illumination system.

17. A method of producing an image, comprising:
   producing light;
   directing the light onto an array of individually addressable pixels disposed between a package lid and a package substrate of a package, wherein the light is defocused from the pixel array;
   passing the light from the illumination system through a light blocking/absorbing aperture that is disposed between the illumination system and the pixel array and located closer to a focal plane of the light directed onto the array than the array is located to the focal plane;
   modulating the light by the pixels of the pixel array; and
   causing the modulated light to be displayed on a display target.

18. The method of claim 17, wherein the pixel array is a plane that is away from a focal plane of the light.

* * * * *